United States Patent [19]

Kiblawi et al.

[11] Patent Number: 4,903,809
[45] Date of Patent: Feb. 27, 1990

[54] REVERSIBLE CLUTCH RELEASE BEARING ASSEMBLY

[75] Inventors: Daniel F. Kiblawi, Rochester Hills; Eugene A. Wolbers, Northville; Thomas M. Frusti, Farmington Hills, all of Mich.

[73] Assignee: Federal-Mogul Corporation, Southfield, Mich.

[21] Appl. No.: 319,821

[22] Filed: Mar. 3, 1989

Related U.S. Application Data

[63] Continuation of Ser. No. 148,534, Jan. 26, 1988, abandoned.

[51] Int. Cl.$^4$ ............................................. F16D 23/12
[52] U.S. Cl. ..................................... 192/98; 192/110 B
[58] Field of Search ............. 192/98, 110 B; 384/495, 384/498

[56] References Cited

U.S. PATENT DOCUMENTS

| | | | |
|---|---|---|---|
| 1,684,471 | 9/1928 | Carhart | 192/110 B |
| 4,519,488 | 5/1985 | Renaud | 192/98 |
| 4,726,696 | 2/1988 | Dickinson et al. | 384/495 |

FOREIGN PATENT DOCUMENTS

| | | | |
|---|---|---|---|
| 567829 | 12/1958 | Canada | 384/495 |
| 210894 | 2/1987 | European Pat. Off. | 192/98 |
| 400905 | 8/1924 | Fed. Rep. of Germany | 192/110 B |
| 2455644 | 5/1976 | Fed. Rep. of Germany | 192/98 |

Primary Examiner—Leslie A. Braun
Assistant Examiner—David A. Testardi
Attorney, Agent, or Firm—Lawrence J. Shurupoff

[57] ABSTRACT

A reversible clutch release bearing assembly (20) including a housing (32) forming by identical first and second parts (34) and (35) engaged by a shifting fork (33). First and second parts of the housing each include a bearing cavity portion (36) surrounded by a perimeter lip (38). An anti-friction bearing (39) is contained within a bearing cavity (37) defined by the bearing cavity portions (36). A pair of wear pads (48) are attached at spaced locations to the outer side of the perimeter lips (38). The perimeter lips (38) extend on one side of the first and second parts of the housing to form flanges (50). Planar fork guide surfaces (52) are secured to the flanges (50) by a U-shaped bracket (54).

20 Claims, 3 Drawing Sheets

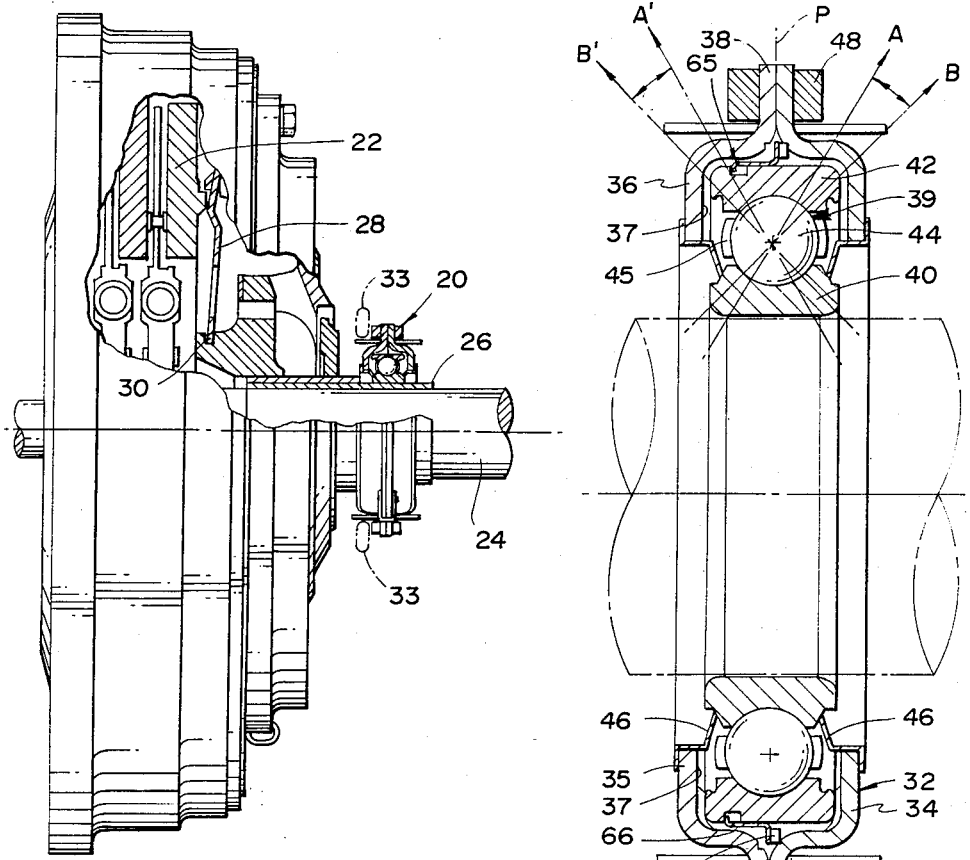
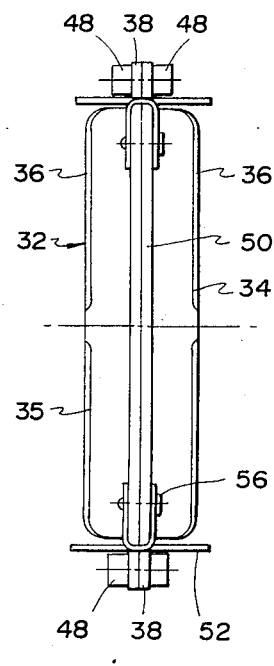
Fig. 1
Fig. 2
Fig. 3

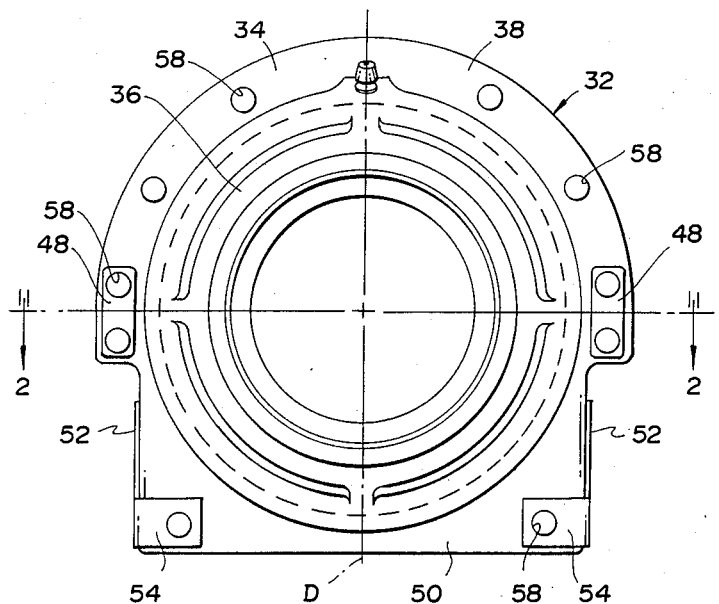
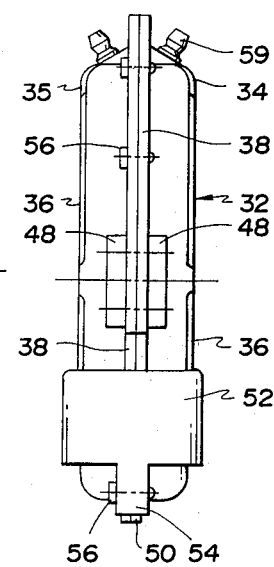
Fig. 4    Fig. 5
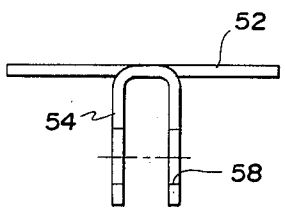
Fig. 6
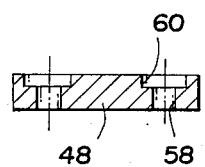
Fig. 7
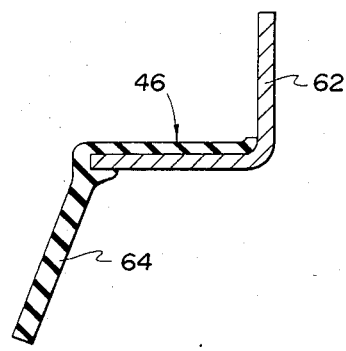
Fig. 8

REVERSIBLE CLUTCH RELEASE BEARING ASSEMBLY

This application is as continuation of application Ser. No. 148,534, filed Jan. 26, 1988, now abandoned.

TECHNICAL FIELD

This invention relates to a clutch release bearing and more specifically relates to a clutch release bearing having a substantially symmetrical housing for reversibly mounting the clutch release bearing.

BACKGROUND ART

Vehicle drivetrains having manually shiftable gears employ transmission clutches which are engaged and disengaged by a clutch release bearing during shifting. The clutch release bearing is engaged by a fork which is slidably mounted on a sleeve or quill. The clutch release bearing is part of an assembly which includes an anti-friction bearing having a first race non-rotatively supported by a housing and a second race which rotates with the fingers of the clutch pressure plate.

Commercial vehicle clutch release bearings require periodic replacement. Clutch release bearings receive localized wear on the inner and outer races. The point on the housing which is contacted by the shifting fork wears as a result of repeated engagement by the fork.

To accommodate radial misalignment between the axes of the quill and rotating clutch fingers, it is conventional for clutch release bearing assemblies to support the release bearing so as to be self-aligning. The ability of clutch release bearings to accommodate radial and angular clutch misalignment is important in reducing wear of the clutch release bearing.

DISCLOSURE OF THE INVENTION

One object of the present invention is to provide a reversible clutch release bearing which can virtually double the useful life of the self-aligning clutch release bearing.

Another object of the present invention is to provide a clutch release bearing which can be assembled in either of two possible orientations in the same application.

An additional object of the present invention is to provide a clutch release bearing assembly in which localized worn surface portions of the inner and outer races created when the clutch release bearing is operated in one orientation are replaced by substantially unworn surfaces by reversing the orientation of the clutch release bearing on the shaft. After reversing, different portions of the inner and outer races present new regions for receiving localized stress.

In carrying out the above objects and other objects of the invention, a clutch release bearing assembly includes a housing having identical first and second parts. The housing parts each have a cup shaped bearing cavity portion and a perimeter lip portion extending about the bearing cavity portion. An anti-friction bearing is received in the bearing cavity portions. The anti-friction bearing includes an inner race, an outer race, and rolling elements disposed between the inner and outer races.

The housing includes a pair of wear pads attached at circumferentially spaced portions of each of the first and second parts of the housing on the perimeter flanges. The perimeter flanges are aligned relative to a plane which extends radially through the center of the rolling elements. The housing is symmetrical relative to the plane thereby permitting the bearing to be assembled to a shaft with either the first part or the second part of the housing facing the clutch.

In the preferred construction, first and second parts of the housing are identical and are assembled to each other oppositely oriented relative to the plane extending through the rolling elements. The perimeter lips of the first and second parts of the housing each have a radially extending flange extending from one side. The flanges are preferably symmetrical relative to a diametrical line bisecting the flanges and extending through the axis of the anti-friction bearing. Planar fork guide surfaces are secured to the radially extending flanges of the first and second parts adjacent the wear pads and are oriented perpendicular to the plane extending through the rolling elements and also perpendicular to the perimeter lips of the first and second housing parts. The fork guide surfaces are preferably secured to the housing with a U-shaped bracket that encompasses the flanges of the first and second parts of the housing.

A self-aligning mechanism is provided for radially aligning the bearing assembly within the housing. The self-aligning mechanism includes an annular case having a first flange which engages an annular groove formed in the outer race of the antifriction bearing. A second flange of the case extends between the inner surface of the first and second housing parts adjacent a radially inner edge of the perimeter flanges. An annular biasing element such as a wave spring engages the second flange of the annular case and the inner surface of one of the housing parts to exert a biasing force against the annular ring in an axial direction. The biasing force results in a frictional force which radial immobilizes the bearing assembly unless a greater radial force is applied to the bearing thereby urging the bearing to a different position within the housing. An annular indentation is preferably formed on the inner surface of the first and second housing parts and the annular biasing element seats against one of the annular indentations.

The objects, features, and advantages of the present invention will become readily apparent from the following detailed description of the best mode for carrying out the invention when taken in connection with the accompanying drawings.

BRIEF DESCRIPTION OF THE DRAWINGS

FIG. 1 is a partial cross-sectional top plan view taken through a clutch of a vehicle drivetrain which includes a reversible clutch release bearing assembly constructed in accordance with the present invention;

FIG. 2 is a diametrical cross-sectional view taken through the reversible clutch release bearing assembly constructed in accordance with the present invention;

FIG. 3 is a bottom plan view of the clutch release bearing assembly of the present invention;

FIG. 4 is a front elevation view of the clutch release bearing assembly of the present invention;

FIG. 5 is a side elevation plan view of the clutch release bearing assembly of the present invention;

FIG. 6 is a elevation view of planar fork guide surfaces and associated U-shaped mounting bracket of the present invention;

FIG. 7 is a cross-sectional view of a wear pad of the present invention;

FIG. 8 is a cross-sectional view of a seal of the present invention;

BEST MODE FOR CARRYING OUT THE INVENTION

Figure 9:
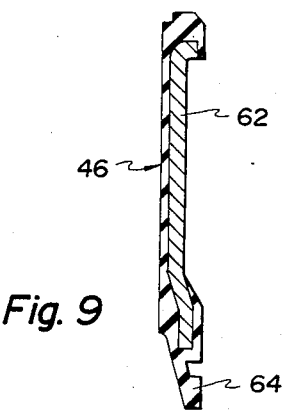
FIG. 9 is a cross-sectional view of an alternative seal construction of the present invention.
Figure 10:
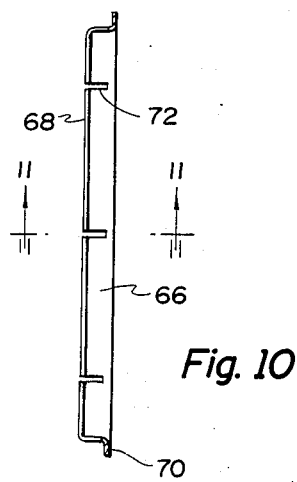
FIG. 10 is an elevation view of the annular case used to accommodate angular misalignment of the bearing of the present invention.
Figure 11:
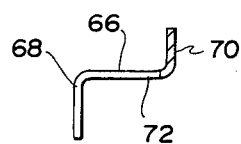
FIG. 11 is an enlarged partial cross-sectional view of the annular case taken along the line 11—11 in FIG. 10.

Referring now to FIG. 1 of the drawings, the reversible clutch release bearing 20 of the present invention is shown operatively engaging a clutch 22. The clutch 22 is of the pull type which is disengaged by pulling the clutch release bearing 20 away from the clutch 22. It should be noted that the bearing of the present invention could be modified for use with push type clutches that are disengaged by sliding the clutch release bearing toward the clutch. The clutch release bearing 20 is mounted on a rotatable shaft 24 by a rotatable sleeve 26 which rotates with the clutch fingers 28 of the clutch 22. The sleeve 26 includes a slot 30 which captures one end of the clutch fingers 28 to secure them to the sleeve 26.

Referring now to FIGS. 1 through 5 of the drawings, the clutch release bearing assembly 20 includes a housing generally indicated at 32. The clutch release bearing assembly 20 is engaged by a clutch actuator such as fork 33 which pulls the clutch release bearing away from the clutch 22 to disengage the clutch. Contact stresses of the bearing are localized in the regions of the inner and outer races between lines A and B in FIG. 2. When the bearing assembly is reversed in orientation relative to the plane P to prolong the life of the bearing assembly, localized stress occurs at the region between lines A' and B'.

The housing 32 preferably includes identical first and second parts 34 and 35. Each of the first and second parts 34 and 35 includes a bearing cavity portion 36 which defines a bearing cavity 37 when the first and second parts 34 and 35 are assembled together. Perimeter lips 38 circumscribe the bearing cavity portions 36 of each of the housing parts. The perimeter lips 38 of the first and second parts 34 and 35 are assembled together in a face to face relationship with the bearing cavity portions open to each other when the housing 32 is assembled. An anti-friction bearing 39 is housed within the bearing cavity 37 of the housing 32.

Referring now to FIGS. 2 and 3, the anti-friction bearing 39 is shown to include an inner race 40 and an outer race 42 which are separated by rolling elements 44. Plane P extends through the center of rolling elements 44. The rolling elements 44 are preferably positioned by a retainer or a bearing cage 45. A seal 46 is disposed between the inner race 40 and the housing 32 or outer race 42 to contain grease for the anti-friction bearing 39.

The housing 32 is preferably provided with two pairs of wear pads 48 at circumferentially spaced locations on the radially extending perimeter lip 38. The wear pads 48 are diametrically located on and supported by the perimeter lip and are provided on the outside of both the first and second parts 34 and 35 of the housing 32.

Referring now to FIGS. 4 through 6, a flange 50 is shown extending from one side of the perimeter lip 38. Each of the first and second parts 34 and 35 of the housing 32 are symmetrical relative to a diametrical line D which bisects the flange 50 and extends through the axis of rotation of the anti-friction bearing 39. Planar fork guide surfaces 52 are attached to the outer edges of the flange 50 by an integrally formed U-shaped bracket 54.

The first and second parts 34 and 35 of the housing 32 are secured by fasteners 56, preferably rivets. The fasteners 56 are also used to attach the wear pads 48 and U-shaped bracket 54 to the housing 32. The fasteners 56 are inserted through holes 58 formed in the housing 32, the wear pads 48 and the U-shaped bracket 54.

Grease fittings 59 are provided on the housing so that grease can be supplied to the anti-friction bearing 39 through the housing 32.

Referring now to FIG. 7, a cross-section of a wear pad 48 is shown. The holes 58 have a counterbore 60 at one end within which the head of a fastener 56 is received. The wear pads 48 are preferably formed of a hardened steel or other appropriate wear resistant material.

Figure 14:
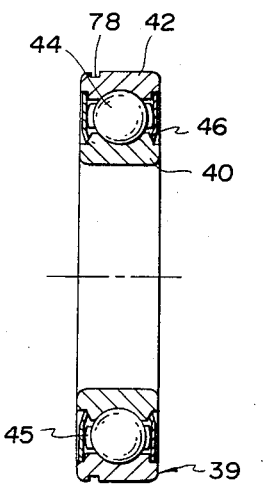
FIG. 14 is a cross-sectional view of the anti-friction bearing of the present invention.

Referring now to FIGS. 8 and 9, two alternative seals 46 are shown. The seal depicted in FIG. 8 is shown installed in FIG. 2. The seal 46 includes a case 62 and an elastomeric lip 64 which is bonded to the case. The case is secured to the housing and is stationary. The seal lip 64 engages against the rotating inner ring 40. The seal of FIG. 9 includes an elastomeric portion extending the entire length of the case which terminates at the end opposite the elastomeric lip and is adapted to be press fit inside the outer race as shown in FIG. 14.

Referring now to FIGS. 2 and 10 through 15, the construction of the self-aligning mechanism generally indicated by numeral 65 in FIG. 2 will be described in detail. Annular case 66 having a first flange 68 extending radially inwardly from the annular case 66 is adapted to be received in an annular groove 78 formed in the outer race 42. The annular case 66 includes a second flange 70 which extends radially outwardly from the annular case and is adapted to be received between the first and second parts 34 and 35 of the housing 32. The annular case 66 features slots 72 which permit the annular case to spread slightly when the annular case is inserted over anti-friction bearing 39. The slots facilitate relubrication of the anti-friction bearing through the fitting 59 by allowing the grease to pass through the slots 72 into the anti-friction bearing 39. The annular case 66 is pushed over the anti-friction bearing 39 until the first flange 68 snaps into the annular slot 78. One of the annular slot 72 is shown in cross-section in FIG. 11.

Figure 12:
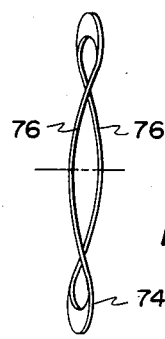
FIG. 12 is an elevation view of the spring used to accommodate angular misalignment of the bearing of the present invention.
Figure 13:
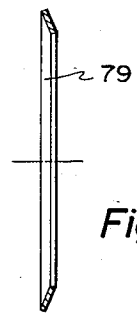
FIG. 13 is a cross-sectional view of an alternative spring construction of the present invention.

Referring now to FIG. 12, a wave spring 74 has a series of curved sections 76. The curved sections 76 are axially offset and circumferentially arrayed so that a spring biasing force is exerted by the spring between the case 66 and the housing 32. The assembly of the case 66, wave spring 74 and housing 32 is best shown in FIG. 2. The wave spring engages the second flange of the case and the inner surface of one of the housing parts to bias the annular ring in an axial direction. The biasing force results in a frictional force between the wave spring and the annular case 66 which radially immobilizes the bearing assembly. If the bearing is misaligned radially relative to the clutch the clutch will exert a greater radial force upon the bearing 39 urging the bearing to an aligned position within the housing. The Belleville washer 79 shown in FIG. 13 can be used as a biasing element in place of wave spring 74.

Figure 15:
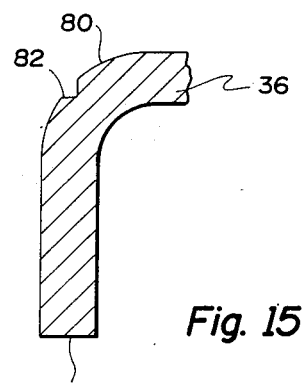
FIG. 15 is a fragmentary cross-sectional view of the inner edge of one part of the housing of the present invention.

Referring now to FIG. 15, the inner edge 80 of the perimeter lip 38 is shown to include an annular indentation 82. The wave spring 74 is preferably seated against one of the annular indentations 82.

While the best mode for carrying out the invention has been described in detail, those familiar with the art to which this invention relates will recognize various alternative designs and embodiments for carrying out the invention as defined by the following claims.

What is claimed is:

1. A clutch release bearing assembly (20) for engaging and disengaging a clutch (22) comprising;
   a housing (22) having first and second parts (34 and 35) defining an internal bearing cavity (37) and a clutch engagement means for engaging a clutch release member (38);
   an anti-friction bearing (39) provided within said bearing cavity (37) and having an inner race (40), an outer race (42), and rolling elements (44); and
   said clutch engagement means (38) being aligned relative to a plane extending radially through the center of the rolling elements (44) to render said housing (32) symmetrical relative to the plane and thereby permit the clutch release bearing assembly to be secured to a shaft with either the first part or the second part of the housing adjacent to the clutch.

2. The clutch release bearing assembly of claim 1 wherein said first and second parts (34 and 35) of said housing (32) are identical and assembled to each other oppositely oriented relative to the plane extending through the rolling elements (44).

3. In the clutch release bearing assembly of claim 1, wear pads (48) attached to each of said first and second parts of said housing at two circumferentially spaced locations.

4. The clutch release bearing assembly of claim 3 wherein said clutch engagement means (38) comprises a radially extending flange (50) on each of the first and second parts, planar fork guide surfaces (52) secured to said radially extending flanges of the first and second parts adjacent said wear pads (48) and oriented perpendicular to the plane extending through the rolling elements (44) and perpendicular to the flanges (50).

5. The clutch release bearing of claim 4 wherein said guide surfaces (52) have a U-shaped bracket (54) which encompasses the flanges (50) of the first and second parts of the housing and secures the fork guide surfaces (52) to the housing (32).

6. In the clutch release bearing of claim 1, seal means (46) for sealing between said housing (32) and said inner race (40), said seal means having a case (62) and an elastomeric seal lip (64) bonded to the case (62) and engaging the inner race.

7. In the clutch release bearing of claim 1, self-aligning means (65) for radially aligning said anti-friction bearing (39) within the housing (32).

8. The clutch release bearing of claim 7 wherein said self-aligning means (65) includes an annular case (66) having a first flange (68) engaging an annular groove (78) in the outer race (42) and a second flange (70) extending between the inner surfaces of said first and second housing parts (34 and 35) radially adjacent a radially inner edge of the clutch engagement means (38), a spring means (74) engaging the second flange (70) and the inner surface of one of said housing parts for biasing the annular case (66) in an axial direction resulting in a frictional force immobilizing the anti-friction bearing (39) radially unless a greater radial force is applied to the bearing which urges the anti-friction bearing to a different position within the housing.

9. The clutch release bearing of claim 8 wherein an annular indentation (82) is formed on the inner surface of said housing and said spring means (74) is seated against the annular indentation.

10. A clutch release bearing assembly (20) adapted to engage and disengage a clutch (22) comprising a housing (32) having first and second parts (34 and 35) defining a bearing cavity (37), an anti-friction bearing received in the bearing cavity (37) and having an inner race (40), an outer race (42), and rolling elements (44) wherein the improvement comprises:
    said first and second parts (34 and 35) of said housing (32) each having a clutch engagement means for engaging a clutch release ember (38) and being assembled symmetrically relative to a plane to thereby permit said bearing to be assembled o a shaft (24) with either the first part (34) or the second part 35) adjacent the clutch (22).

11. The clutch release bearing of claim 10 wherein said first and second parts (34 and 35) of said housing (32) are identical and assembled to each other oppositely oriented relative to the plane extending through the rolling elements (44).

12. In the clutch release bearing of claim 10, wear pads (48) attached to each of said first and second parts (34 and 35) of said housing (32) on the outside of said clutch engagement means (38) at two circumferentially spaced locations.

13. The clutch release bearing of claim 12 wherein each said clutch engagement means (38) comprises a radially extending flange on each of the first and second parts, planar fork guide surfaces (52) secured to said radially extending flanges of the first and second parts adjacent said wear pads (48) and oriented perpendicular to the plane extending through the rolling elements (44) and perpendicular to the flanges (50).

14. The clutch release bearing of claim 13 wherein said guide surfaces (52) have a U-shaped bracket (54) which encompasses the flanges (50) of the first and second parts of the housing and secures the fork guide surfaces (52) to the housing (32).

15. In the clutch release bearing of claim 10, seal means (46) for sealing between said housing (32) and said inner race (40), said seal means having case (62) and an elastomeric seal lip (64) bonded to the case (62) and engaging the inner race.

16. In the clutch release bearing of claim 10, self-aligning means (65) for radially aligning said anti-friction bearing within the housing (32).

17. The clutch release bearing of claim 16 wherein said self-aligning means (65) includes an annular case (66) having a first flange (68) engaging an annular groove (78) in the outer race (42) and a second flange (70) extending between the inner surfaces of said first and second housing parts (34 and 35) radially adjacent a radially inner edge of the perimeter lips (38), a spring means (74) engaging the second flange (70) and the inner surface of one of said housing parts for biasing the annular case (66) in an axial direction resulting in a frictional force immobilizing the antifriction bearing (39) radially unless a greater radial force is applied to the anti-friction bearing which urges the bearing to a different position within the housing.

18. The clutch release bearing of claim 17 wherein an annular indentation is formed on the inner surface of said housing and said spring means (74) is seated against the annular indentation.

19. A clutch release bearing assembly alternately mountable in either a first orientation or a second orientation on a shaft to engage a clutch actuator in either of said orientations, said assembly comprising:
  a housing defining an internal cavity and radially extending support means;
  bearing means provided within said vacity; and
  axially opposed wear pad means provided on said support means for engaging said clutch actuator, said wear pad means comprising a first wear surface means disposed exclusively in said first orientation for engagement with said clutch actuator and a second wear surface means disposed exclusively in said second orientation for engagement with said clutch actuator, said first and second orientations defined by selective positioning of said assembly on said shaft.

20. A clutch release bearing assembly alternately mountable in either a first orientation or a second orientation on a shaft to engage a clutch actuator in either of said orientations, said assembly comprising:
  a bearing housing;
  bearing means operatively associated with said bearing housing; and
  axially opposed clutch actuator engagement means provided on said housing for engaging said clutch actuator, said clutch actuator engagement means comprising a first wear surface means disposed exclusively in said first orientation for engagement with said clutch actuator and a second wear surface means disposed exclusively in said second orientation for engagement with said clutch actuator, said first and second orientations defined by selective positioning of said assembly on said shaft.

* * * * *

UNITED STATES PATENT AND TRADEMARK OFFICE
CERTIFICATE OF CORRECTION

PATENT NO. : 4,903,809

DATED : February 27, 1990

INVENTOR(S) : Daniel F. Kiblawi, Eugene A. Wolbers and Thomas M. Frusti

It is certified that error appears in the above-identified patent and that said Letters Patent is hereby corrected as shown below:

In the abstract, line 2, "forming" should read -- formed --.

Column 2, line 35, "radial" should read -- radially --.

Column 3, line 8, before "spring" insert thereat -- wave --.

Column 6, line 26, "ember" should read -- member --.

Column 6, line 28, "o" should read -- to --.

Column 6, line 43, after "flange" insert thereat --( 50 )--.

Column 6, line 68, "the perimeter lips (38)" should read --thereat each said clutch engagement means (38)--.

Column 7, line 18, "vacity" should read --cavity--.

Signed and Sealed this

Twenty-eighth Day of April, 1992

Attest:

HARRY F. MANBECK, JR.

*Attesting Officer*     *Commissioner of Patents and Trademarks*